Aug. 16, 1955     H. A. MINTZ     2,715,239
WINDSHIELD WIPER TENSIONERS
Filed March 20, 1952
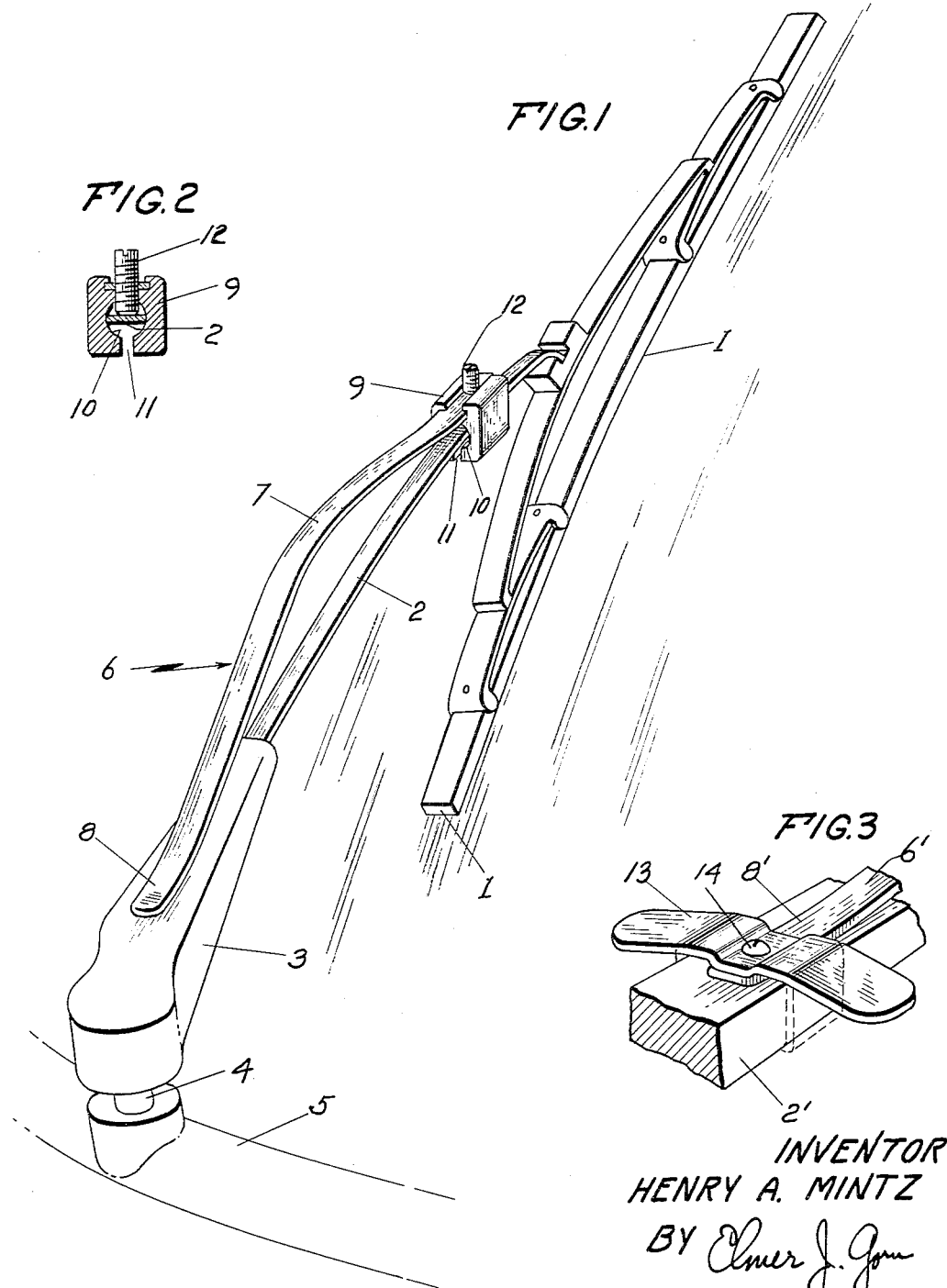
INVENTOR
HENRY A. MINTZ
BY *Elmer J. Gorn*
ATTORNEY

United States Patent Office 2,715,239
Patented Aug. 16, 1955

2,715,239

WINDSHIELD WIPER TENSIONERS

Henry A. Mintz, Norwood, Mass.

Application March 20, 1952, Serial No. 277,634

5 Claims. (Cl. 15—255)

This invention relates to windshield wipers and more particularly to a simple tensioning device which may be attached to such wiper and which may regulate and control the pressure of the windshield wiper against the windshield glass.

The desirability of means to control the pressure of a windshield wiper blade against the glass of the windshield has produced a number of devices which may be attached to the wiper arm for such purpose. However, such devices have heretofore possessed the drawbacks of being relatively complex, difficult to attach and difficult to maintain in proper position and adjustment. In accordance with the present invention, there has been produced an extremely simple device which, when slipped into place on the wiper arm and rotated through ninety degrees, is automatically retained accurately and securely in place. Thereupon, the adjustment of a single screw may be used to lock the tensioner against removal. Thus the present invention eliminates the drawbacks of the previous devices of this kind.

The invention which accomplishes the above and other advantages briefly consists of a bowed strip of spring material carrying at one end a block with a bore having curved or tapered sides to receive the windshield wiper arm but provided with a narrow access slot so that the wiper arm may be introduced only by turning the block on its side and, after the arm is introduced, the block is turned through ninety degrees to retain the device in position by the pressure of the other end of the spring strip against the lower portion of the wiper arm. The block may also have a screw to lock the device in place, and the other end of the strip may have a flexible retaining strap.

The invention, together with its various advantages, will be best understood from the following description of exemplifications thereof, reference being had to the accompanying drawing, wherein:

Fig. 1 is a general perspective view of a windshield wiper with the novel tensioning device attached thereto;

Fig. 2 is a cross section taken through the block at one end of the tensioning device; and Fig. 3 is an enlarged detail of the lower end of another embodiment of the tensioner having a flexible retaining strip secured thereto.

The arrangement in Figs. 1 and 2 shows a standard type of windshield wiper consisting of a wiper blade 1 carried by a wiper arm 2 mounted at its lower end in a rigid casing 3 which, in turn, is mounted on and driven by the wiper drive shaft 4 which emerges through an appropriate portion of the windshield frame 5. The novel tensioner comprises a strip 6 of a stiff spring material such as spring steel. This strip is formed with a central bowed portion 7 tending to force an outer end 8 against the wiper arm structure. At the opposite end from end 8 is rigidly mounted a block 9, preferably of metal. The block 9 is provided with a longitudinal bore 10. This bore is conveniently of cylindrical form, thus providing curved inner surfaces against which the edges of the arm 2 may rest. However, if desired, these inner surfaces might be tapered otherwise. The bore 10 is provided with a narrow access slot 11 only slightly wider than the thickness of the arm 2.

In order to mount the tensioner on the wiper arm, the spring strip 6, together with the block 9, is turned on its side, the arm 2 slipped through the slot 11, and the strip 6 and block 9 turned through substantially ninety degrees to the position shown in the drawing. By this action the end 8 of the strip 6 is brought to bear on the casing 3 thus tensioning the spring strip 6. As a result, the arm 2 seats itself firmly against the curved walls of the bore 10, which effectively prevent all sideways turning motion of the block 9. The total effect is to snap the tensioner firmly into place on the arm 2 without the necessity of complicated clamping devices.

A screw 12 is also preferably tapped through the top of block 9 and the strip 6. By tightening the screw 12, the tensioner is locked against release.

While in practically all cases there is no tendency for the end 8 to move off from the lower end of the wiper arm structure, in some instances a wiper construction may be encountered which may make it desirable to add such a retaining strap as is shown in Fig. 3. In this figure, the spring strip is designated by the reference numeral 6' while its end is designated as 8'. The retaining strap 13 is secured to the end 8' by some suitable means such as a rivet 14. The strap 13 is made of a soft, flexible material such as aluminum, which can be bent around the sides of a wiper arm 2' as shown by the dotted lines in Fig. 3. Under these conditions, the end 8 cannot be accidentally dislodged. However, if removal of the tensioner is desired, the sides of the strap 13 may be bent back, whereupon the tensioner may be removed in the normal manner.

Of course it is to be understood that this invention is not limited to the particular details as described above, as many equivalents will suggest themselves to those skilled in the art. It is accordingly desired that the appended claims be given a broad interpretation commensurate with the scope of this invention.

What is claimed is:

1. A tensioner for a windshield wiper arm comprising a strip of stiff spring material, a block rigidly secured to one end of said strip, said block having a longitudinal bore formed therethrough, the cross-sectional area of said bore being of a size to receive a flat windshield wiper arm, said block being formed with a single limited access slot into said bore, the width of said slot being less than the width of such wiper arm and slightly larger than the thickness of such wiper arm and the cross-section of said bore being wider than said slot and of a width sufficient to permit rotation of said wiper arm therein through an angle of substantially ninety degrees, said strip being bowed in the plane of said access slot whereby said tensioner may be mounted securely on such wiper arm by inserting such arm through said slot and rotating the tensioner through substantially a right angle.

2. A tensioner for a windshield wiper arm comprising a strip of stiff spring material, a block rigidly secured to one end of said strip, said block having a longitudinal bore formed therethrough, the cross-sectional area of said bore being of a size to receive a flat windshield wiper arm, said block being formed with a single limited access slot into said bore, the side walls of said bore sloping toward said access slot whereby said wiper arm may seat itself against said sloping sides, the width of said slot being less than the width of such wiper arm and slightly larger than the thickness of such wiper arm and the cross-section of said bore being wider than said slot and of a width sufficient to permit rotation of said wiper arm therein through an angle of substantially ninety degrees whereby said tensioner may be mounted securely on such wiper arm by inserting such arm through said slot and rotating the tensioner through substantially a right angle.

3. A tensioner for a windshield wiper arm comprising a strip of stiff spring material, a block rigidly secured to one end of said strip, said block having a longitudinal bore formed therethrough, the cross-sectional area of said bore being of a size to receive a flat windshield wiper arm, said block being formed with a single limited access slot into said bore, a locking screw threaded through said block opposite said access slot, the width of said slot being less than the width of such wiper arm and slightly larger than the thickness of such wiper arm and the cross-section of said bore being wider than said slot and of a width sufficient to permit rotation of said wiper arm therein through an angle of substantially ninety degrees whereby said tensioner may be mounted securely on such wiper arm by inserting such arm through said slot and rotating the tensioner through substantially a right angle and locked in place by tightening said screw against such arm.

4. A tensioner for a windshield wiper arm comprising a flat strip of stiff spring material, a block rigidly secured to one end of said strip, said block having a longitudinal bore formed therethrough, the cross-sectional area of said bore being of a size to receive a flat windshield wiper arm, said block being formed with a single limited access slot into said bore, the plane of said flat strip being substantially at right angles to said access slot, the width of said slot being less than the width of such wiper arm and slightly larger than the thickness of such wiper arm and the cross-section of said bore being wider than said slot and of a width sufficient to permit rotation of said wiper arm therein through an angle of substantially ninety degrees whereby said tensioner may be mounted securely on such wiper arm by inserting such arm through said slot and rotating the tensioner through substantially a right angle to cause the flat surface of said strip to press against a flat surface on such arm.

5. A tensioner for a windshield wiper arm comprising a strip of stiff spring material, a solid block rigidly secured to one end of said strip, said block having a substantially cylindrical bore formed therethrough, the diameter of said bore being substantially the same as the width of a flat windshield wiper arm to be received therein, said block being formed with a single limited access slot into said bore, the width of said slot being less than the width of such wiper arm and slightly larger than the thickness of such wiper arm, said strip being bowed in the plane of said access slot whereby said tensioner may be mounted securely on such wiper arm by inserting such arm through said slot and rotating the tensioner through substantially a right angle.

References Cited in the file of this patent
UNITED STATES PATENTS

| | | |
|---|---|---|
| 1,626,629 | Sayre | May 3, 1927 |
| 1,681,724 | Demand | Aug. 21, 1928 |
| 1,730,998 | Dimick | Oct. 8, 1929 |
| 2,025,888 | Olivero | Dec. 31, 1935 |
| 2,087,178 | Zaiger | July 13, 1937 |
| 2,120,945 | Sprankle | June 14, 1938 |
| 2,128,068 | Anderson | Aug. 23, 1938 |
| 2,147,113 | Smulski | Feb. 14, 1939 |